(12) United States Patent
Hisanabe et al.

(10) Patent No.: US 10,700,560 B2
(45) Date of Patent: Jun. 30, 2020

(54) SINTERED MAGNET

(71) Applicant: TDK Corporation, Tokyo (JP)

(72) Inventors: Hideyuki Hisanabe, Tokyo (JP); Hiroshi Ito, Tokyo (JP); Yoshiaki Okada, Tokyo (JP)

(73) Assignee: TDK Corporation, Tokyo (JP)

( * ) Notice: Subject to any disclaimer, the term of this patent is extended or adjusted under 35 U.S.C. 154(b) by 281 days.

(21) Appl. No.: 15/703,248

(22) Filed: Sep. 13, 2017

(65) Prior Publication Data

US 2018/0083499 A1    Mar. 22, 2018

(30) Foreign Application Priority Data

Sep. 16, 2016   (JP) .................... 2016-181452

(51) Int. Cl.
| | |
|---|---|
| *H02K 1/17* | (2006.01) |
| *H02K 23/04* | (2006.01) |
| *H02K 1/02* | (2006.01) |
| *H02K 1/18* | (2006.01) |

(52) U.S. Cl.
CPC .............. *H02K 1/17* (2013.01); *H02K 1/02* (2013.01); *H02K 1/185* (2013.01); *H02K 23/04* (2013.01)

(58) Field of Classification Search
CPC ............ H02K 1/17; H02K 1/02; H02K 1/185; H02K 23/04
See application file for complete search history.

(56) References Cited

U.S. PATENT DOCUMENTS

| | | | | | |
|---|---|---|---|---|---|
| 3,293,466 | A | * | 12/1966 | Henry-Baudot | H02K 23/04 310/154.46 |
| 4,112,320 | A | * | 9/1978 | Mohr | H01F 7/021 310/154.25 |
| 5,105,113 | A | * | 4/1992 | Ishikura | H02K 23/04 310/154.29 |
| 8,106,609 | B2 | * | 1/2012 | Haussecker | H02K 23/04 310/68 B |
| 2006/0192454 | A1 | * | 8/2006 | Yamada | H02K 23/04 310/154.22 |
| 2015/0125337 | A1 | * | 5/2015 | Tsukada | B22F 3/02 419/40 |

FOREIGN PATENT DOCUMENTS

| | | |
|---|---|---|
| CN | 101615470 A | 12/2009 |
| JP | 2551545 B2 | 11/1996 |
| JP | 2002-078252 A | 3/2002 |

* cited by examiner

*Primary Examiner* — Jue Zhang
*Assistant Examiner* — Bart Iliya
(74) *Attorney, Agent, or Firm* — Faegre Drinker Biddle & Reath LLP

(57) ABSTRACT

A sintered magnet has an arc shape cross-section defined by an outer arc, an inner arc, and a pair of end sides connecting an end point of the outer arc and an end point of the inner arc, and a range of an central angle α of the inner arc is $145° \leq \alpha \leq 180°$. The inventors have newly found that a large magnetic flux can be obtained according to the sintered magnet and the characteristics of the motor can be improved, using such a sintered magnet.

5 Claims, 7 Drawing Sheets

SINTERED MAGNET

CROSS-REFERENCE TO RELATED APPLICATIONS

This application is based upon and claims the benefit of priority from Japanese Patent Application No. 2016-181452, filed on 16 Sep. 2016, the entire content of which is incorporated herein by reference.

Technical Field

The present disclosure relates to a sintered magnet.

Background

From the related art, a technique for using a ferrite magnet, which is one type of sintered magnet, for a motor has been known. For example, Japanese Unexamined Patent Publication No. 2002-78252 discloses a motor which includes a cylindrical housing, a rotor housed in the housing, and a plurality of ferrite magnets having an arc shape cross-section attached to an inner surface of the housing.

The inventors have newly found a technique capable of improving the motor characteristics by repeatedly conducting research to improve the characteristics of the above-described motor to increase an amount of magnetic flux (flux) of the ferrite magnet.

According to the present disclosure, there is provided a sintered magnet capable of improving the motor characteristics.

SUMMARY

A sintered magnet according to an aspect of the present disclosure has an arc shape cross-section defined by an outer arc, an inner arc, and a pair of end sides connecting an end point of the outer arc and an end point of the inner arc, and a range of an central angle $\alpha$ of the inner arc is $145° \leq \alpha \leq 180°$.

The inventors have newly found that a large magnetic flux can be obtained according to the sintered magnet and the characteristics of the motor can be improved, using such a sintered magnet.

In a sintered magnet according to another aspect, in the arc shape cross-section, the end side may include a first end side linearly extending from the end point of the outer arc, and a second end side linearly extending from the end point of the inner arc, and the first end side may be parallel to a bisector direction of the central angle of the inner arc. When the first end side is parallel to the bisector direction of the central angle of the inner arc, cracks hardly occur at the end portion of the sintered magnet at the time of sintering, as compared to a case where the first end side is inclined with respect to the bisector direction of the central angle of the inner arc.

In a sintered magnet according to another embodiment, in the arc shape cross-section, when a length of the first end side in the bisector direction of the central angle of the inner arc is defined as $\delta$, and a length of the second end side in a direction orthogonal to the bisector direction of the central angle of the inner arc is defined as $\gamma$, there is a relation of $0.5 \leq \delta/\gamma \leq 5.0$. In this case, while maintaining a large magnetic flux, it is possible to obtain a green density sufficiently high for practical use and to achieve a high yield.

In a sintered magnet according to another embodiment, in the arc shape cross-section, the second end side may be inclined toward the inner arc side with respect to a first reference line passing through an end point of the inner arc and being parallel to a direction orthogonal to the bisector direction of the central angle of the inner arc, and when the angle formed between the second end side and the first reference line may be defined as $\beta$, there is a relation of $0° < \beta < 90°$. In this case, the sintered magnet can be easily disposed in the motor, using the U-shaped pin.

In a sintered magnet according to another embodiment, the second end side may include an inner end side linearly extending from the end point of the inner arc to a relay point, and an outer end side linearly extending from the relay point to the first end side, the outer end side may be inclined toward the inner arc side with respect to a second reference line passing through the relay point and being parallel to a direction orthogonal to the bisector direction of the central angle of the inner arc, and when the angle formed between the inner end side and the first reference line is defined as $\beta$ and the angle formed between the outer end side and the second reference line is defined as $\epsilon$, there is a relation of $0° < \epsilon - \beta \leq 45°$. In this case, it is possible to obtain satisfactory compactibility and to suppress occurrence of cracks.

In the sintered magnet according to another embodiment, a range of the central angle $\alpha$ of the inner arc may be $145° \leq \alpha \leq 175°$. In this case, the magnetization rate of the sintered magnet can be improved.

The sintered magnet according to an aspect of the present disclosure may be a sintered ferrite magnet.

DETAILED DESCRIPTION

Figure 1:
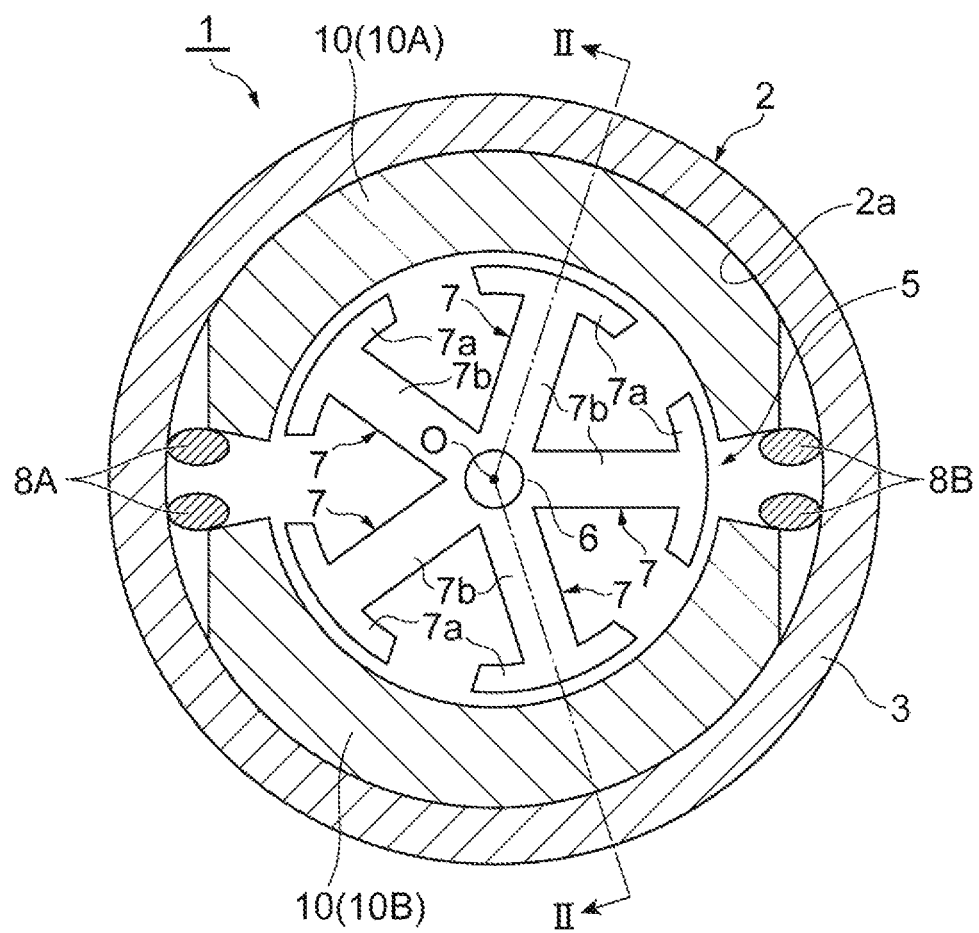
FIG. 1 is a schematic cross-sectional view of a plane orthogonal to a rotational center axis of the motor according to the embodiment.

Hereinafter, a mode for carrying out the present disclosure will be described in detail with reference to the accompanying drawings. The same or equivalent elements are denoted by the same reference numerals, and the description thereof will not be provided when the description is repeated.

First, a configuration of a motor 1 according to the embodiment will be described with reference to FIGS. 1 and 2.

Figure 2:
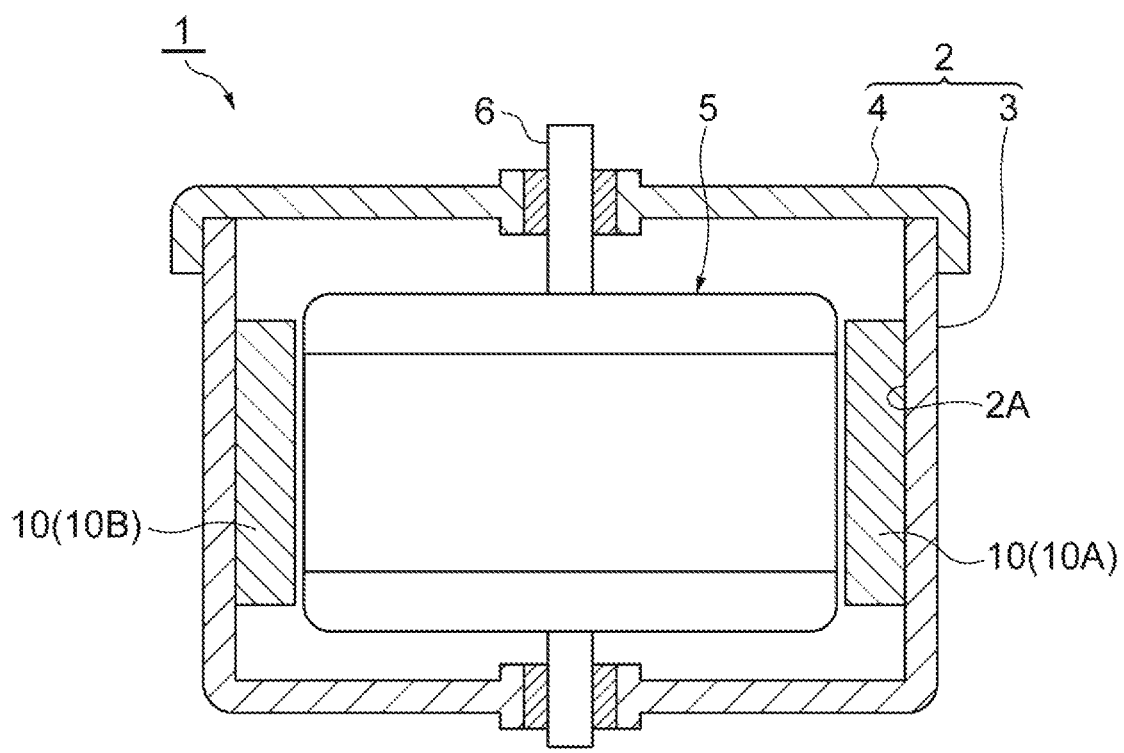
FIG. 2 is a cross-sectional view taken along the line II-II of the motor illustrated in FIG. 1.

FIGS. 1 and 2 are diagrams illustrating a schematic structure of the motor 1 which is a DC machine. As illustrated in FIG. 1, the motor 1 mainly includes a housing 2, a rotor 5, and a pair of sintered magnets 10.

As illustrated in FIG. 2, the housing 2 includes a bottomed cylindrical member 3, and a lid member 4 which closes the opening of the bottomed cylindrical member 3. The housing 2 is made of a ferromagnetic material such as silicon steel or soft iron. The housing 2 also has a function as a yoke, in addition to a function as a housing. As illustrated in FIG. 1, the cross-sectional shape of the bottomed cylindrical member 3 is a true circular ring shape in the present embodiment. The cross-sectional shape of the bottomed cylindrical member 3 is not necessarily limited to a true circular shape, but may be a slightly flat elliptical ring shape or an annular shape having a flat portion in a part thereof.

The pair of sintered magnets 10 is attached to an inner surface 2a of the housing 2 along a circumferential direction. A sintered magnet 10A and a sintered magnet 10B constituting the pair of sintered magnets 10 are magnetized to form a N-pole and a S-pole as will be described later, and have the same sectional shape and the same sectional dimension. The pair of sintered magnets 10 faces each other with the rotor 5 interposed therebetween, and is disposed to be symmetrical with respect to the rotor 5. The pair of sintered magnets 10 is urged by a pair of U-shaped pins 8A and 8B illustrated in FIG. 1 in a direction away from each other (the up-down direction in FIG. 1), and the positions thereof are fixed.

The sintered magnet 10 is a sintered ferrite magnet, for example, a sintered magnet having hexagonal M-type ferrite as a main phase. The composition of the sintered magnet 10 is set such that, when at least one kind of element selected from Sr, Ba, Ca and Pb is defined as A, at least one kind of element selected from the rare earth elements and Bi and necessarily containing La is defined as R, and Co or Co and Zn are defined as M, the main component thereof is represented by the formula $A_{1-x}R_x(Fe_{12-y}M_y)_zO_{19}$.

The rotor 5 is interposed between the pair of sintered magnets 10 in the housing 2. The rotor 5 has a rotary shaft 6 and a plurality (five in FIG. 1) of T-shaped teeth 7, and in addition, the rotor 5 has a coil or a commutator (not illustrated) wound around the teeth 7. Each tooth 7 has a distal end portion 7a and an aim portion 7b, and the distal end portion 7a extending in the circumferential direction is provided at the distal end of an arm portion 7b extending in the radial direction with respect to the rotational center axis O of the rotary shaft 6. The teeth 7 are formed at equal intervals around the rotational center axis O of the rotary shaft 6. In the present embodiment, adjacent teeth 7 are formed so that an angle formed by the center lines thereof is 72°(=360°/5).

Subsequently, the shape of the sintered magnet 10 will be described with reference to FIGS. 3 and 4. Since the cross sections of the pair of sintered magnets 10 have the same size and shape, only the sintered magnet 10 (for example, the sintered magnet 10A) will be described, and the description of the other sintered magnet will not be provided.

Figure 3:
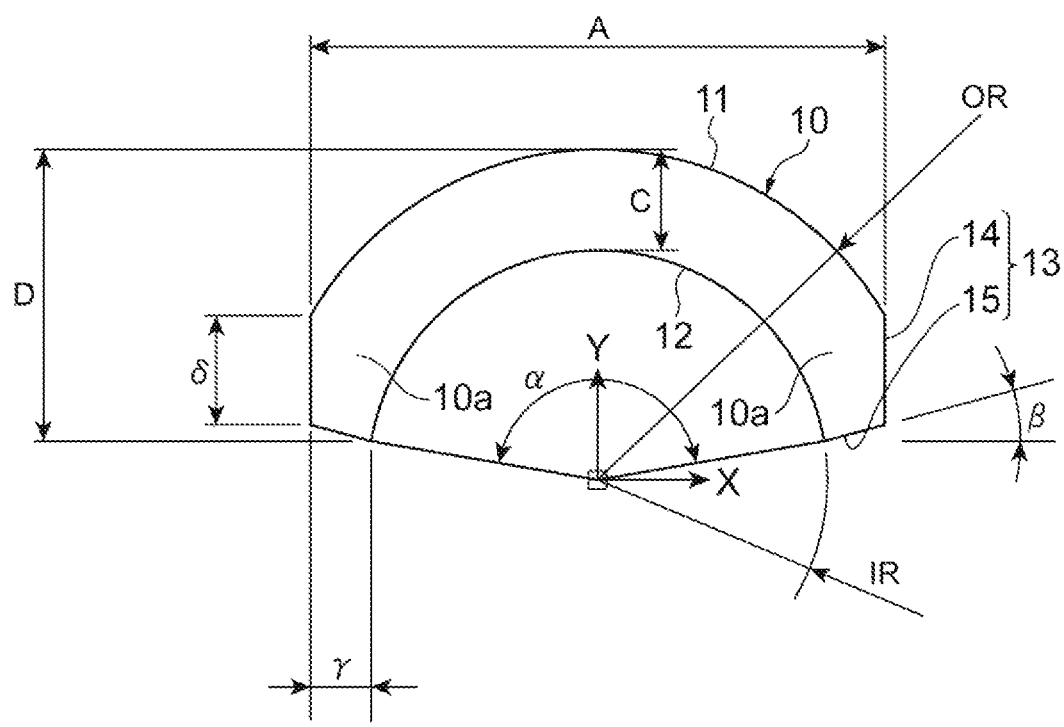
FIG. 3 is a view illustrating the sintered magnet of FIG. 1.
Figure 4:
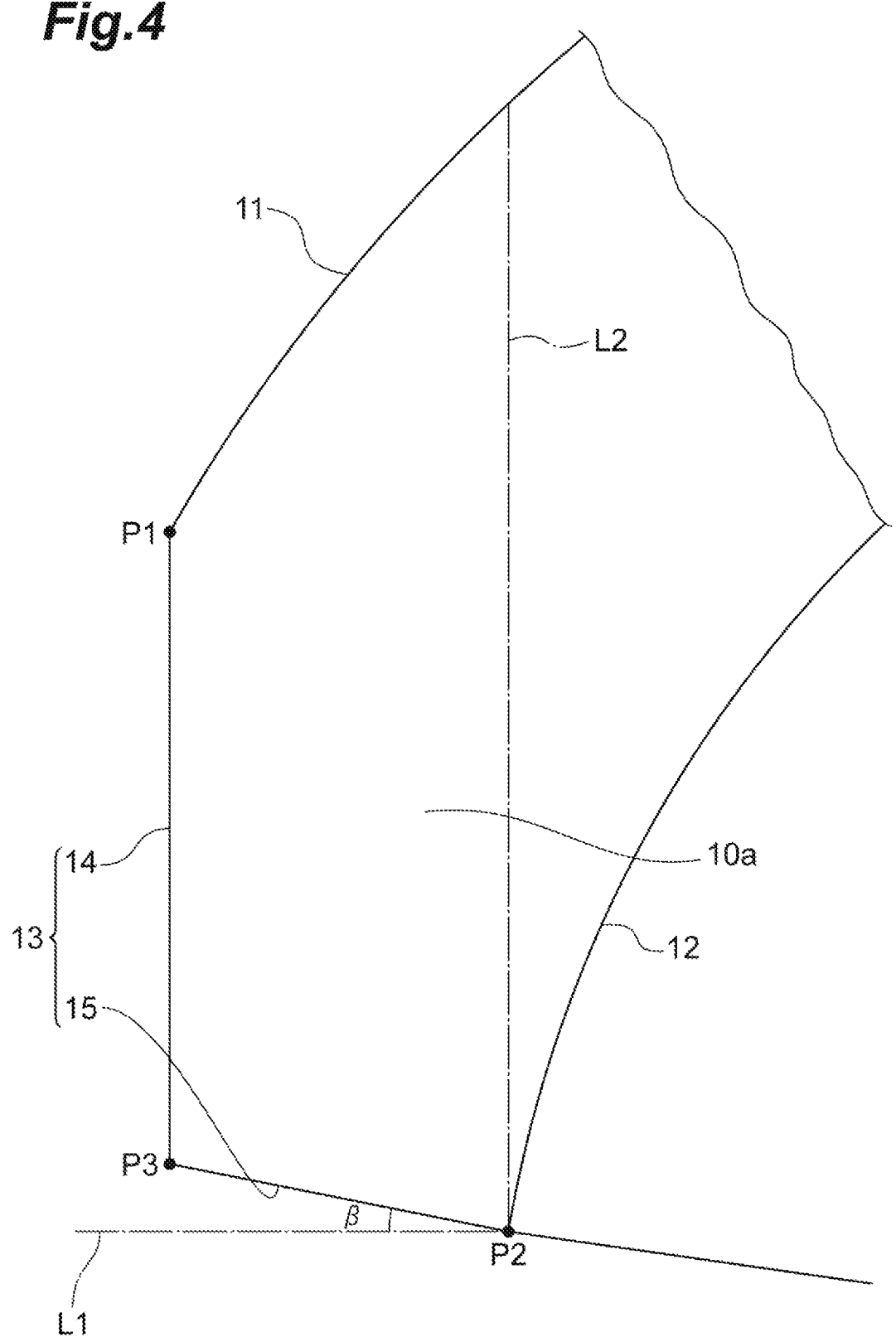
FIG. 4 is an enlarged view of a main part illustrating an end portion of the sintered magnet illustrated in FIG. 3.

As illustrated in FIGS. 3 and 4, the sintered magnet 10 has an arc shape cross-sectional shape. More specifically, the sintered magnet 10 has an arc shape cross-section defined by an outer arc 11, an inner arc 12, and a pair of end sides 13 connecting an end point P1 of the outer arc 11 and an end point P2 of the inner arc 12. The cross-sectional shape of the sintered magnet 10 can also resemble a fan shape, a bow shape, a circular arc shape, C-shape, or U-shape.

Here, a pressing process performed when manufacturing the sintered magnet 10 will be described with reference to FIG. 5. Hereinafter, as an example, a pressing process in dry form will be described.

Figure 5:
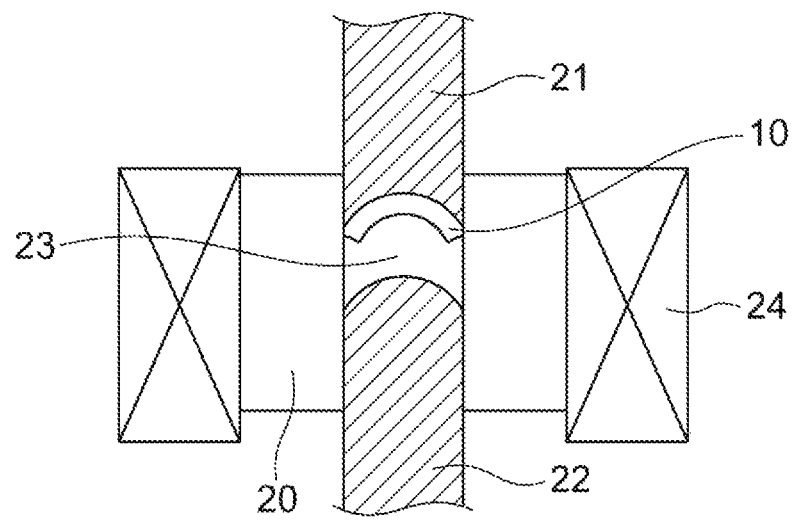
FIG. 5 is a view illustrating a state of a pressing process at the time of manufacturing the sintered magnet of FIG. 1.

In the apparatus illustrated in FIG. 5, an upper punch 21 and a lower punch 22 are fitted into a mold 20, raw material powder is filled in a cavity 23, and then pressed with the upper punch 21, thereby obtaining a green compact.

In the pressing process, the radial direction of the sintered magnet 10 is oriented to become an easy axis of magnetization. The sintered magnet 10 is uniformly oriented in the radial direction so that the surface magnetic flux density on the inner arc 12 side becomes strong. Since the surface magnetic flux density on the side of the inner arc 12 is required to be constant in the circumferential direction, the upper punch 21 is made of a nonmagnetic material, and the lower punch 22 is made of a magnetic material. By forming the upper punch 21 using the nonmagnetic material, the direction of the magnetic field in the cavity 23 upon application of the magnetic field is dissipated from the lower punch 22. That is, there is no situation in which the orientation of the sintered magnet 10 is focused on the outer circumferential surface or the partial deviation of the orientation direction occurs, and the sintered magnet 10 can be aligned uniformly in the radial direction. However, if the upper punch 21 is made of a non-magnetic material, since the strength of the magnetic field between the upper punch 21 and the lower punch 22 decreases, it is necessary to make the strength of the magnetic field higher than a case where the upper punch 21 is made of a magnetic material. However, because the required magnetic field varies depending on the area, thickness, or the like of the green compact, the applied magnetic field may be appropriately selected every time depending on the green compact.

The obtained green compact is sintered at a predetermined sintering temperature (for example, 1240° C.), and then subjected to surface processing, thereby obtaining the sintered magnet 10 described above. The surface of the green compact after the surface processing has a surface roughness (ten point average roughness (Rz)) in the range of 3.5 z to 10 z in a part or the whole thereof.

Subsequently, the magnetization process performed when manufacturing the sintered magnet 10 will be described with reference to FIG. 6.

Figure 6:
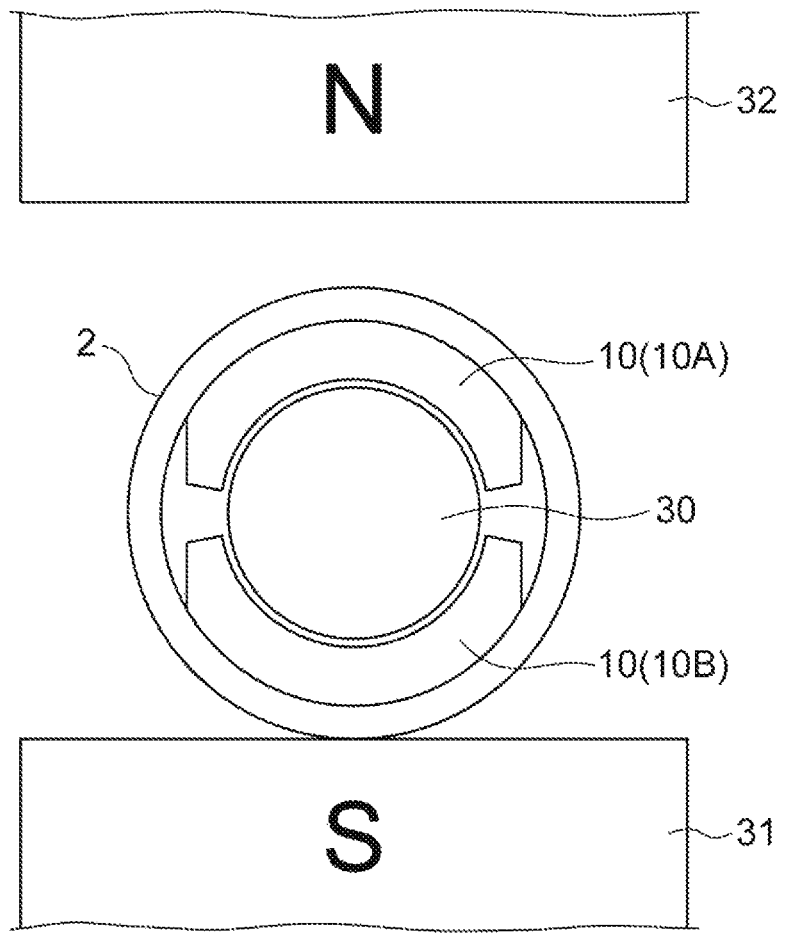
FIG. 6 is a view illustrating a state of a magnetizing process at the time of manufacturing the sintered magnet of FIG. 1.

As illustrated in FIG. 6, the sintered magnet 10 is magnetized in a state of being assembled in the housing 2. At the time of magnetization, in addition to the non-magnetized sintered magnet 10, an iron core 30 having the same external dimensions as the rotor 5 is housed in the housing 2.

In the apparatus illustrated in FIG. 6, a pair of magnetizing yokes 31 and 32 of different polarities is disposed to face each other, and the non-magnetized sintered magnet 10 assembled inside the housing 2 is disposed between the pair of magnetizing yokes 31 and 32. At this time, the sintered magnets 10 are disposed so that a pair of sintered magnets 10 is aligned in the opposing direction (that is, in the up-down direction in FIG. 6) of the pair of magnetizing yokes 31 and 32, that is, the respective sintered magnets 10 are located on the side of the corresponding magnetizing yokes 31 and 32. At the time of magnetization, coils (not illustrated) are wound around the magnetizing yokes 31 and 32, and a current of a predetermined direction is made to flow through each coil to generate a magnetic flux.

Next, the shapes, dimensions and angles of the sintered magnet 10 in cross sections illustrated in FIGS. 3 and 4 will be described.

For convenience of explanation, in the cross section of FIG. 3, the description will be provided on the assumption that an central angle of the inner arc 12 is defined as α, a bisector direction of the central angle α of the inner arc 12 is defined as a Y direction, a direction orthogonal to the bisector direction of the central angle α of the inner arc 12 is defined as a X direction, a length (a width dimension) of the sintered magnet 10 in the X direction is defined as A, a length (a height dimension) of the sintered magnet 10 in the Y direction is defined as D, and the distance between the outer arc 11 and the inner arc 12 (a thickness dimension of the sintered magnet 10) is defined as C. Further, a diameter of the outer arc 11 (an outer diameter) is defined as OR, and a diameter of the inner arc 12 (an inner diameter) is defined as IR.

Further, in the sintered magnet 10 of the present embodiment, the center of curvature of the outer arc 11 and the center of curvature of the inner arc 12 are coincident with each other, and the thickness C of the sintered magnet 10 is equal to a difference between the outer diameter OR and the inner diameter IR. A slight deviation can be allowed between the center of curvature of the outer arc 11 and the center of curvature of the inner arc 12 within a practically acceptable range.

In the sintered magnet 10, the range of the central angle α of the inner arc 12 is 145°≤α≤180°, and the central angle α of the inner arc 12 is 160° as an example.

The inventors prepared samples 11 to 16 in which the central angle α of the inner arc 12 is set to a plurality of different angles and measured the amount of magnetic flux and the magnetization rate of the sintered magnet 10 for each sample. The results are as illustrated in Table 1. The total flux was measured as the amount of magnetic flux, and the ratio between the case of adopting the usual magnetization method as the magnetization rate and the case of being perfectly magnetized was determined.

TABLE 1

| Sample No. | Central angle (α) [°] | Amount of magnetic flux [μWb] | Magnetization rate |
|---|---|---|---|
| 11 | 135 | 153 | 100% |
| 12 | 140 | 154 | 100% |
| 13 | 145 | 160 | 100% |
| 14 | 160 | 163 | 100% |
| 15 | 175 | 163 | 98% |
| 16 | 180 | 163 | 95% |

Various dimensions of each sample illustrated in Table 1 are as illustrated in Table 2.

TABLE 2

| Sample No. | Central angle α [°] | Outer diameter OR (mm) | Inner diameter IR (mm) | Thickness C (mm) | Width A (mm) | Height D (mm) |
|---|---|---|---|---|---|---|
| 11 | 135 | 11.5 | 8 | 3.5 | 20 | 8.44 |
| 12 | 140 | 11.5 | 8 | 3.5 | 20 | 8.76 |
| 13 | 145 | 11.5 | 8 | 3.5 | 20 | 9.09 |
| 14 | 160 | 11.5 | 8 | 3.5 | 20 | 10.11 |
| 15 | 175 | 11.5 | 8 | 3.5 | 20 | 11.15 |
| 16 | 180 | 11.5 | 8 | 3.5 | 20 | 11.5 |

Further, regarding the dimensions and conditions of the motor 1 used for the measurement, the length of the housing 2 was 25 mm, the thickness of the housing 2 was 2 mm, the diameter of the rotor 5 was 15 mm, the length of the rotor 5 was 18 mm, the slot number was 5, the opening width was 1.5 mm, the height of tooth 7 was 4.69 mm, the width of tooth 7 was 2 mm, the thickness of tooth 7 was 1 mm, the number of poles was 2, the residual magnetic flux density (Br) was 415 mT, and the inherent holding force (HcJ) was 263 kA/m. Further, the height of the tooth 7 is the sum of the length of the distal end portion 7a in the radial direction of the rotational center axis O of the rotary shaft 6 and the length of the arm portion 7b. The width of the tooth 7 is the length of the arm portion 7b in a direction orthogonal to the radial direction of the rotational center axis O of the rotary shaft 6. The thickness of the tooth 7 is the length of the distal end portion 7a in the radial direction of the rotational center axis O of the rotary shaft 6. As the housing 2 and the rotor 5, a housing and a rotor made of silicon steel were used.

As illustrated in the Table 1, from the above measurement results, it was found that practically sufficient magnetic flux cannot be obtained in samples 11 and 12 in which the central angle α of the inner arc 12 is less than 145°. It is considered that, in samples 14 to 16 in which the central angle α of the inner arc 12 is 160° or more, the amount of magnetic flux has the same value because the magnetic flux is saturated in the sintered magnet 10. On the other hand, when the central angle α of the inner arc 12 exceeds 180°, since the sum of the central angles α of the inner arcs 12 of the pair of sintered magnets exceeds 360°, it is not possible to house a pair of sintered magnets 10 inside the housing 2 unlike the case illustrated in FIG. 1.

As in the sintered magnet 10 illustrated in FIG. 3, in the samples 13 to 16 in which the range of the central angle α of the inner arc 12 is 145°≤α≤180°, it is possible to achieve a sufficiently high amount of magnetic flux for practical use in the pair of sintered magnets 10 housed in the housing 2. Therefore, the characteristics of the motor 1 can be improved. When the amount of magnetic flux of the sintered magnet 10 is high, the motor 1 can improve the motor torque or suppress the current or the rotational speed.

Further, as illustrated in Table 1, the range of the central angle α of the inner arc 12 can be set to 145°≤α≤175° from the viewpoint of the magnetization rate of the sintered magnet 10.

That is, when the central angle α of the inner arc 12 exceeds 175° as in the sample 16, particularly, magnetization in the vicinity of the end portion 10a of the sintered magnet 10 becomes difficult and the magnetization rate decreases. Thus, from the viewpoint of the magnetization rate of the sintered magnet 10, the central angle α of the inner arc 12 can be set to 175° or less.

As illustrated in FIG. 3 and FIG. 4, in the end portion 10a of the sintered magnet 10, the end side 13 includes a first end side 14 and a second end side 15.

The first end side 14 linearly extends from the end point P1 of the outer arc 11 and extends parallel to the Y direction (that is, the bisector direction of the central angle α of the inner arc 12). In a case where the first end side 14 extends in parallel to the Y direction, as compared to a case where the first end side 14 is inclined with respect to the Y direction, it is possible to increase the density of the end portion 10a of the sintered magnet 10 in the above-described pressing process, and a situation in which cracks occur in the end portion 10a is effectively suppressed. Hereinafter, the length of the first end side 14 in the Y direction is indicated by δ.

The second end side 15 linearly extends from the end point P2 of the inner arc 12 to the outer arc 11 side and intersects with the first end side 14 at an intersection point P3. Further, the second end side 15 is inclined toward the inner arc 12 side (the upper side in the Y direction of FIG. 3) with respect to the reference line L1 (first reference line) passing through the end point P2 of the inner arc 12 and being parallel to the X direction. Further, the configuration in which the second end side 15 is inclined toward the inner arc 12 side means that the second end side 15 is inclined toward the aperture of the sintered magnet 10 in which the inner arc 12 exists. Hereinafter, the length of the second end side 15 in the X direction is denoted by γ, and the angle formed between the second end side 15 and the reference line L1 is denoted by β.

In the sintered magnet 10, the range of the ratio (δ/γ) of the length δ of the first end side 14 in the Y direction to the length γ of the second end side 15 in the X direction is 0.5≤δ/γ≤5.0, and as an example, δ/γ is 1.8.

The inventors prepared samples 21 to 26 in which the ratio (δ/γ) of the length δ of the first end side 14 in the Y direction to the length γ of the second end side 15 in the X direction is set to a plurality of different values, measured the amount of magnetic flux, green density and yield of the sintered magnet 10 for each sample, and obtained the results as illustrated in the following Table 3. The total flux was measured as the amount of magnetic flux, and to obtain the density after pressing of the portion corresponding to the end portion 10a of the sintered magnet 10 as the density of the green compact, and the ratio of the sintered magnet having no crack after sintering was determined as the yield.

TABLE 3

| Sample No. | δ/γ | Amount of magnetic flux [μWb] | Density of molded body [g/cm$^3$] | Yield |
|---|---|---|---|---|
| 21 | 0 | 163 | 2.53 | 83% |
| 22 | 0.5 | 163 | 2.63 | 94% |
| 23 | 1.8 | 163 | 2.77 | 96% |
| 24 | 3 | 162 | 2.75 | 95% |
| 25 | 5 | 157 | 2.75 | 91% |
| 26 | 7 | 151 | 2.68 | 63% |

Various dimensions of each sample illustrated in Table 3 are as illustrated in Table 4.

TABLE 4

| Sample No. | δ/γ | Central angle α[°] | δ (mm) | γ (mm) | Outer diameter OR (mm) | Inner diameter IR (mm) | Thickness C (mm) | Width A (mm) | Height D (mm) |
|---|---|---|---|---|---|---|---|---|---|
| 21 | 0 | 160 | 0 | 3.45 | 11.5 | 8 | 3.5 | 22.65 | 10.11 |
| 22 | 0.5 | 160 | 1.41 | 3.12 | 11.5 | 8 | 3.5 | 22 | 10.11 |
| 23 | 1.8 | 160 | 3.92 | 2.12 | 11.5 | 8 | 3.5 | 20 | 10.11 |
| 24 | 3 | 160 | 4.84 | 1.60 | 11.5 | 8 | 3.5 | 18.96 | 10.11 |
| 25 | 5 | 160 | 5.57 | 1.12 | 11,5 | 8 | 3.5 | 18 | 10.11 |
| 26 | 7 | 160 | 5.95 | 0.85 | 11.5 | 8 | 3.5 | 17.46 | 10.11 |

Further, regarding the dimensions and conditions of the motor 1 used for the measurement, the length of the housing 2 was 25 mm, the thickness of the housing 2 was 2 mm, the diameter of the rotor 5 was 15 mm, the length of the rotor 5 was 18 mm, the slot number was 5, the central width was 1.5 mm, the height of tooth 7 was 4.69 mm, the width of tooth 7 was 2 mm, the thickness of tooth 7 was 1 mm, the number of poles was 2, residual magnetic flux density (Br) was 415 mT, and inherent holding force (HcJ) was 263 kA/m. As the housing 2 and the rotor 5, a housing and a rotor made of silicon steel were used.

As illustrated in the above Table 3, from the above measurement results, it was clear that in sample No. 21 in which the value of δ/γ is less than 0.5, it was not possible to obtain a practically sufficient green density and yield. When the value of δ/γ is extremely close to 0, the density of the portion corresponding to the end portion 10a of the sintered magnet 10 is lowered, and it is considered that cracks are likely to occur in that portion. The end portion 10a of the sintered magnet 10 can be defined, for example, as a portion on the side closer to the end side 13 than the reference line L2 passing through the end point P2 of the inner arc 12 and being parallel to the Y direction.

On the other hand, in sample 26 in which the value of δ/γ exceeds 5, it is clear that the practically sufficient magnetic flux cannot be obtained.

As in the sintered magnet 10 illustrated in FIGS. 3 and 4, in the case of the samples 22 to 25 in which the values of δ/γ are in the range of 0.5≤δ/γ≤5.0, the high green density is obtained at the time of pressing to achieve a high yield, and the sintered magnet 10 having a sufficiently high amount of magnetic flux for practical use can be obtained. Therefore, the characteristics of the motor 1 can be improved.

Further, in the sintered magnet 10, if the length δ of the first end side 14 in the Y direction is too short, the density of the portion corresponding to the end portion 10a of the sintered magnet 10 decreases, and it is considered that cracks are likely to occur in that portion. In addition, when the length δ of the first end side 14 in the Y direction becomes short, there may be a failure in which the upper punch 21 and the lower punch 22 of the above-described pressing apparatus easily interfere with each other. On the other hand, if the length δ of the first end side 14 in the Y direction is too tong, it is difficult to secure the length γ of the second end side 15 in the X direction, and the amount of magnetic flux decreases. Also, at the time of pressing, the density difference of the green compact becomes large. Furthermore, incorporation into the motor 1 also becomes difficult.

Further, in the sintered magnet 10, the range of the angle β between the second end side 15 and the reference line L1 is 0°<β<90°, the angle β may be 2° to 20°. As an example, the angle β is 10°.

When the angle β formed between the second end side 15 and the reference line L1 is 90°, it is not possible to interpose the U-shaped pins 8A and 8B (see FIG. 1) between the pair of sintered magnets 10. By setting the angle β formed between the second end side 15 and the reference line L1 to be less than 90°, it is possible to easily dispose the sintered magnet 10 in the housing 2 of the motor 1, using the U-shaped pins.

Figure 7:
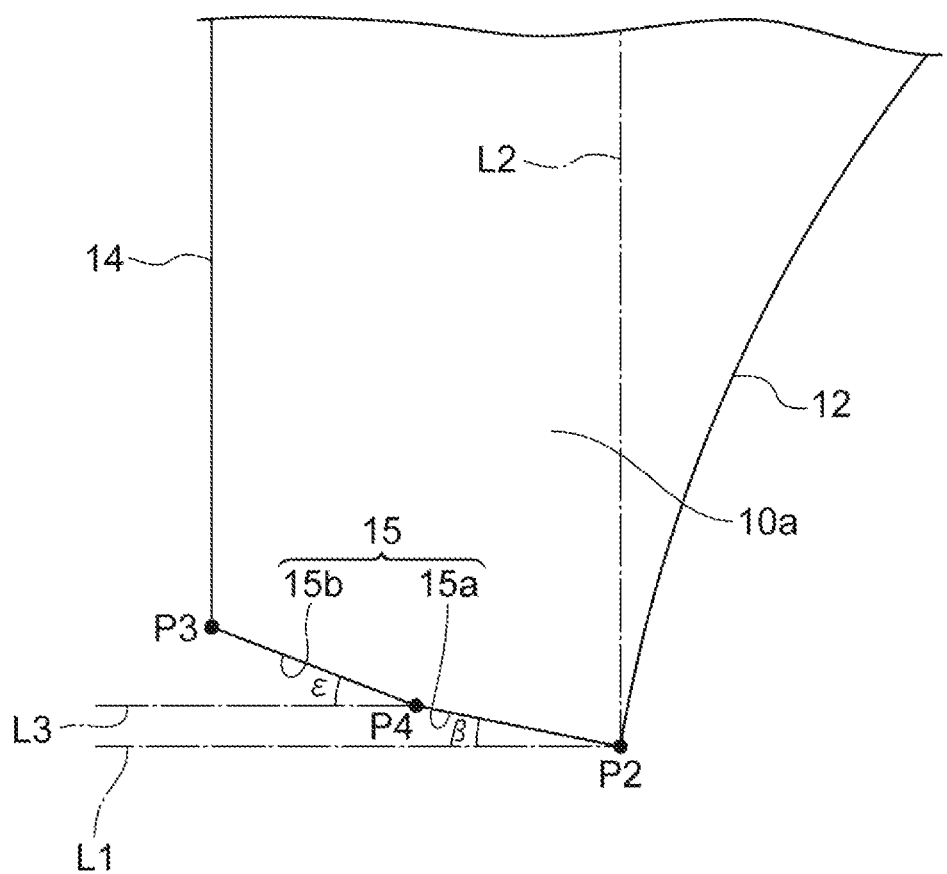
FIG. 7 is an enlarged view of a main part illustrating end portions of a sintered magnet of a different form.

Further, as illustrated in FIG. 7, the second end side 15 constituting the end side 13 at the end portion 10a of the sintered magnet 10 may have two end sides including the inner end side 15a and the outer end side 15b. That is, the second end side 15 is divided into the inner end side 15a and the outer end side 15b at the relay point P4 existing on the second end side 15.

The inner end side 15a linearly extends from the end point P2 of the inner arc 12 toward the outer arc 11 side to the relay point P4, and the outer end side 15b linearly extends from the relay point P4 to an intersection point P3 between the first end side 14 and the second end side 15. The inner end side 15a is inclined toward the inner arc 12 side with respect to the reference line L1 passing through the end point P2 of the inner arc 12 and being parallel to the X direction, and the outer end side 15b is inclined toward the inner arc 12 side with respect to the reference line L3 (second reference line) passing through the relay point P4 and being parallel to the X direction.

Assuming that the angle formed between the inner end side 15a and the reference line L1 is β and the angle formed between the outer end side 15b and the reference line L3 is ε, the angle ε is larger than the angle β (ε>β). When the angle ε is smaller than the angle β, since the density of the end portion 10a tends to be low, it is difficult to obtain sufficient compactibility. Therefore, by designing the angle ε to be larger than the angle β, satisfactory compactibility can be obtained. The difference between the angle ε and the angle β may be 45° or less (ε−β≤45°), or 30° or less (ε−β≤30°). Further, when the difference between the angle ε and the angle β is large, since the density difference at the end portion 10a becomes large, cracks are likely to occur. Therefore, by setting the difference between the angle ε and the angle β to 45° or less (or 30° or less), it is possible to suppress the occurrence of cracks. Furthermore, the difference between the angle ε and the angle β may be 15° or more (ε−β≥15°). For example, the difference between the angle ε and the angle β may be 15° or more and 30° or less (15°≤ε−β≤30°).

What is claimed is:

1. A sintered magnet having an arc shape cross-section defined by an outer arc, an inner arc, and a pair of end sides connecting an end point of the outer arc and an end point of the inner arc, wherein
    a range of a central angle α of the inner arc is 145°≤α≤180°,
    in the arc shape cross-section, each end side includes a first end side linearly extending from the end point of the outer arc, and a second end side linearly extending from the end point of the inner arc,
    the first end side is parallel to a bisector direction of the central angle of the inner arc, and
    in the arc shape cross-section, when a length of the first end side in the bisector direction of the central angle of the inner arc is defined as δ, and a length of the second end side in a direction orthogonal to the bisector direction of the central angle of the inner arc is defined as γ, there is a relation of 0.5≤δ/γ≤5.0.

2. The sintered magnet according to claim 1, wherein in the arc shape cross-section, the second end side is inclined toward the inner arc side with respect to a first reference line passing through an end point of the inner arc and being parallel to a direction orthogonal to the bisector direction of the central angle of the inner arc, and when the angle formed between the second end side and the first reference line is defined as β, there is a relation of 0°<β<90°.

3. The sintered magnet according to claim 2, wherein the second end side includes an inner end side linearly extending from the end point of the inner arc to a relay point, and an outer end side linearly extending from the relay point to the first end side,
    the outer end side is inclined toward the inner arc side with respect to a second reference line passing through the relay point and being parallel to a direction orthogonal to the bisector direction of the central angle of the inner arc, and
    when the angle formed between the inner end side and the first reference line is defined as β and the angle formed between the outer end side and the second reference line is defined as ε, there is a relation of 0°<ε−β≤45°.

4. The sintered magnet according to claim 1, wherein a range of the central angle α of the inner arc is 145°≤α≤175°.

5. The sintered magnet according to claim 1, wherein the sintered magnet is a sintered ferrite magnet.

* * * * *